United States Patent
Nishio et al.

(10) Patent No.: US 6,645,120 B1
(45) Date of Patent: Nov. 11, 2003

(54) SPEED CHANGE CONTROL DEVICE FOR A CONTINUOUSLY VARIABLE TRANSMISSION

(75) Inventors: Motoharu Nishio, Yokohama (JP); Toshikazu Oshidari, Yokosuka (JP); Jun Sugihara, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 27 days.

(21) Appl. No.: 10/070,276

(22) PCT Filed: Sep. 25, 2000

(86) PCT No.: PCT/JP00/06548

§ 371 (c)(1),
(2), (4) Date: Mar. 6, 2002

(87) PCT Pub. No.: WO01/23784

PCT Pub. Date: Apr. 5, 2001

(30) Foreign Application Priority Data

Sep. 30, 1999 (JP) ............................................. 11-278669

(51) Int. Cl.[7] .............................................. F16H 61/30
(52) U.S. Cl. ................................ 476/10; 476/2; 476/9; 477/37
(58) Field of Search .............................. 476/9, 10, 2, 3, 476/41, 42; 477/37, 38

(56) References Cited

U.S. PATENT DOCUMENTS

| 4,557,706 A | 12/1985 | Tanaka et al. ................ 474/28 |
| 4,857,034 A | 8/1989 | Kouno et al. .................. 474/28 |
| 4,911,030 A | 3/1990 | Kraus ........................... 74/200 |
| 5,031,656 A | * 7/1991 | Benford et al. ............. 137/238 |
| 5,286,240 A | 2/1994 | Kobayashi .................... 476/10 |
| 5,456,340 A | * 10/1995 | Dadel et al. ................ 188/294 |
| 5,902,207 A | * 5/1999 | Sugihara ....................... 476/10 |
| 5,935,039 A | * 8/1999 | Sakai et al. ................... 476/10 |
| 6,132,333 A | * 10/2000 | Inoue et al. .................. 477/37 |

FOREIGN PATENT DOCUMENTS

| EP | 0 435 558 | 7/1991 |
| EP | 0 450 495 | 10/1991 |
| EP | 0 937 913 | 8/1999 |
| JP | 63-130954 | 6/1988 |
| JP | 8-233093 | * 9/1996 |
| JP | 10-213213 | * 8/1998 |
| JP | 11-2302 | 1/1999 |

* cited by examiner

*Primary Examiner*—David Fenstermacher
(74) *Attorney, Agent, or Firm*—Foley & Lardner

(57) ABSTRACT

A speed change control valve (7) houses a spool (8) of comprising a land (83) which can face a supply port (7P) supplying an oil pressure, and lands (84, 85) which can respectively face a pair of drain ports (7D, 7D) formed on either side of the supply port (7P). Output ports (7L, 7H) which allow a first and second oil chamber of an hydraulic cylinder to communicate selectively with the supply port (7P) or the drain ports (7D) according to the displacement of a spool (8), are provided in the speed change control valve (7). In the neutral position of the spool (8), the lands (84, 85) respectively face the drain ports (7D), a width L1 of the land (83) is set to be equal to or greater than a width L1 of the supply port (7P), and a width L3 of the lands (84, 85) is set to a width at which the drain port (7D) can open.

4 Claims, 10 Drawing Sheets

SPEED CHANGE CONTROL DEVICE FOR A CONTINUOUSLY VARIABLE TRANSMISSION

FIELD OF THE INVENTION

This invention relates to the improvement of a speed change control device for a continuously variable transmission used in a vehicle etc.

BACKGROUND OF THE INVENTION

One type of speed change control device known in the art which is widely used employs oil pressure, for example as disclosed in Tokkai Hei 11-2302.

In this control device, a speed change control valve of a toroidal continuously variable transmission takes the form of a spool. The spool is connected to a midway point on a speed change link which is free to swing. One end of the speed change link is connected to an actuator, and the other end is connected with a mechanical feedback mechanism which feeds back the gyration angle (rotation angle) of a power roller.

The differential pressure of two oil chambers of a hydraulic cylinder is adjusted according to the displacement of the spool driven by the actuator. A trunnion which supports a power roller causes the power roller to gyrate when the trunnion is driven in an axial direction, and provides support for the transmission torque applied to the power roller.

SUMMARY OF THE INVENTION

In such a toroidal continuously variable transmission, a high flowrate of lubricating oil is needed for rolling surfaces of the power roller and input and output disks, lubrication of bearings and cooling. When the oil temperature is high, the flowrate of lubricating oil must be even larger to suppress excessive temperature rise of the power rollers, so the discharge flowrate of an oil pump must be set larger than in the case of an automatic transmission using a planetary gear set.

However, in the neutral position of a speed change control valve as in the aforesaid prior art speed change control device for a continuously variable transmission, if the relation of the ports and lands of the spool is set so that they underlap in order to satisfy the dual conditions of speed change control stability and response, each port will be open a fraction even in the neutral position when speed change is not performed. As a result, oil is discharged from the supply ports to the drain ports. The oil used for speed change control is the same as the lubricating oil used for lubrication, so the discharge flowrate of the oil pump must be set even higher. To ensure that there is both sufficient oil flowrate to provide oil stability of speed change control and sufficient oil flowrate for lubricating oil, the load on the engine driving the oil pump increases. In particular, to ensure sufficient discharge flowrate when the engine rotation speed is low, the discharge flowrate specific to the oil pump must be increased, so the pump has to be made larger and fuel-consumption performance may be impaired.

It is therefore an object of this invention, which was conceived in, view of the above problems, to ensure stability of speed change control even when the discharge flowrate is reduced in the neutral position of a speed change control valve in an effort to improve fuel-consumption performance.

In order to achieve above object, this invention provides a speed change control device for a speed change control device for a continuously variable transmission comprising; a trunnion which supports power rollers gripped between input/output disks free to rotate, and is able to rotate around an axis and displace in axial direction,a hydraulic cylinder which drives the trunnion in an axial direction, and a speed change control valve which controls an oil pressure supplied to this hydraulic cylinder, wherein the speed change control valve houses a spool free to displace, the spool comprising; a spool which is housed in the speed change control valve and provides a first land which can face a supply port supplying a supply pressure and second lands which can respectively face first and second drain ports formed on either side of the supply port, first output port is provided for allowing first oil chamber provided in the hydraulic cylinder to selectively communicate with the supply port or the first drain port according to the displacement of the spool, second output port is provided for allowing second oil chamber provided in the hydraulic cylinder to selectively communicate with the supply port or the second drain port according to the displacement of the spool, the first land faces the supply port and the second lands face the first and second drain ports in the neutral position of the spool, and the first land closes the supply port and the second lands are formed such that the first drain port communicate with the first output port which is formed between the first drain port and the supply port, the second drain port communicates with the second output port which is formed between the second drain port and the supply port in the neutral position of the spool.

DESCRIPTION OF THE PREFERRED EMBODIMENTS

Figure 1:
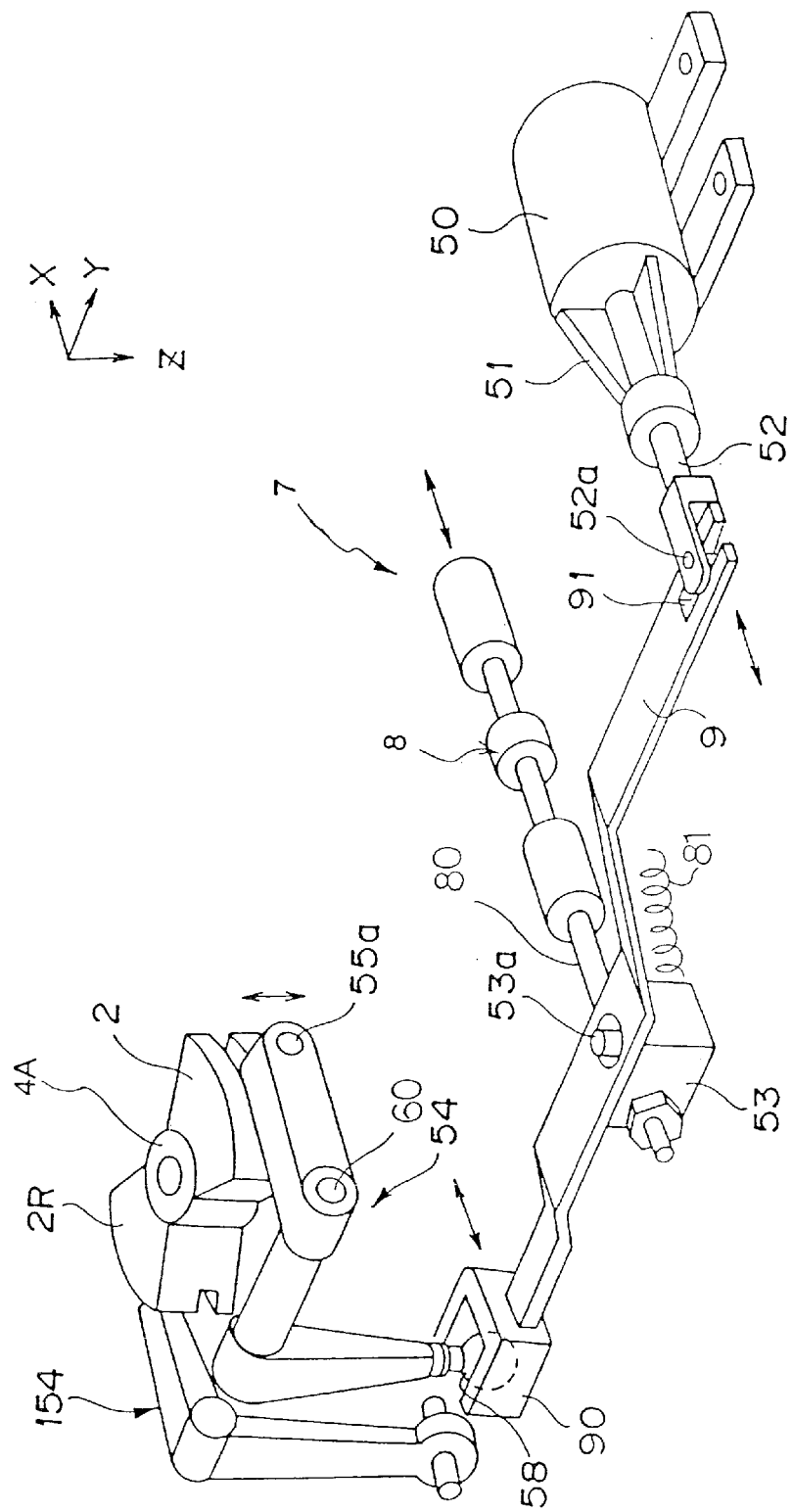
FIG. 1 is a schematic view showing part of a speed change mechanism and oil pressure control mechanism of a toroidal continuously variable transmission according to this invention.
Figure 2:
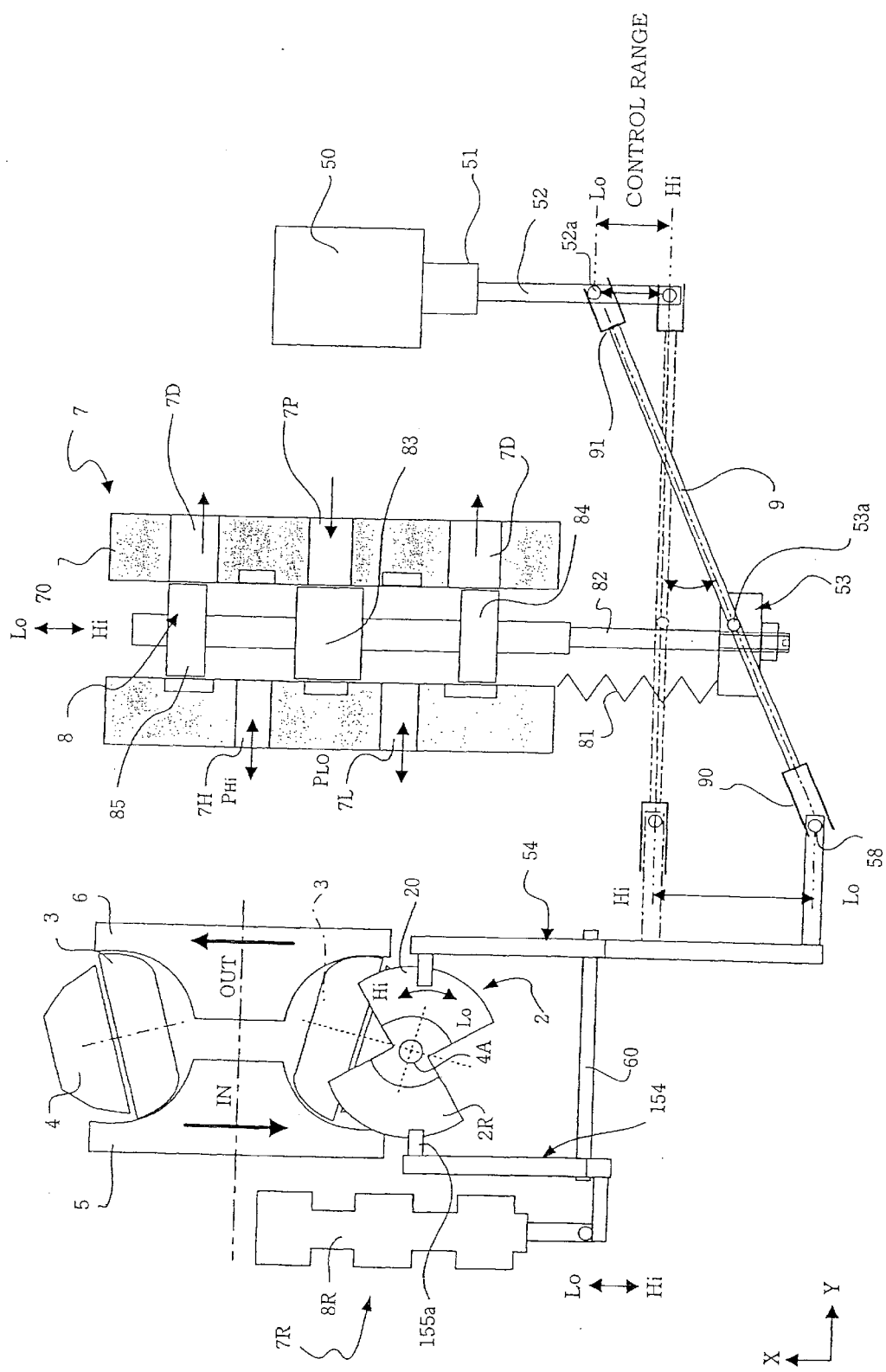
FIG. 2 is a plan view showing the details of a speed change mechanism and oil pressure control mechanism of the toroidal continuously variable transmission according to this invention.
Figure 3:
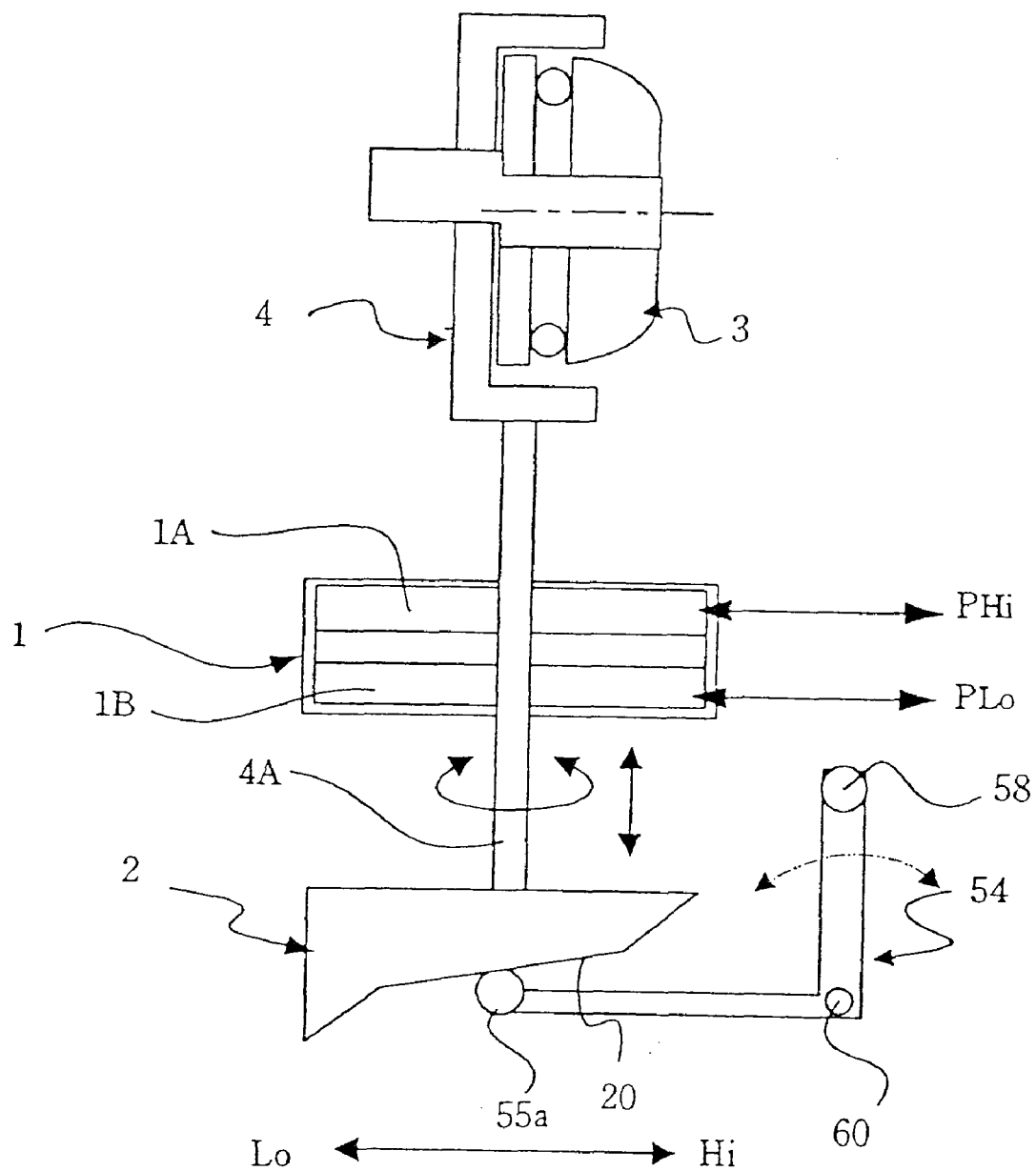
FIG. 3 is a front view showing the details of the speed change mechanism of the toroidal continuously variable transmission according to this invention.

FIG. 1 to FIG. 4 show a speed change control device of a toroidal continuously variable transmission. In FIG. 2 and FIG. 3, power rollers 3,3 are gripped between the opposite faces of input/output disks 5, 6. The power roller 3 is supported by a trunnion 4 via an eccentric axis. An axial part 4A under the trunnion 4 which is connected to a hydraulic cylinder 1, is driven in an axial direction and supported free to rotate around the axis. The axial part 4A continuously modifies a gyration angle (approximately=speed ratio, same hereafter) of the power roller 3.

The plural trunnions 4 supporting the power roller 3 respectively comprise the axial part 4A. One of these axial parts 4A is provided in a one-piece construction with a forward precess cam 2 and a reverse precess cam 2R, as shown in FIG. 1 and FIG. 2. A forward speed change control valve 7 and a reverse speed change control valve 7R are also disposed parallel to one another.

The precess cams 2,2R which feedback the axial displacement and displacement around the axis (gyration angle) respectively to a forward feedback link 54 and reverse feedback link 154, are formed in one-piece construction at the lower end of the axial part 4A. A sloping face 20 is formed on this precess cam 2. The sloping face 20 guides engaging members 55a, 155a of the feedback links 54, 154.

The feedback link 54 is formed from an L-shaped member, and the engaging member 55a which engages with the precess cam 2 is provided at one of its ends. A ball 58 which engages with an engaging member 90 of a speed change link 9 is provided at the other end. The engaging member 90 is formed approximately U-shape in an X-Y plane of FIG. 2, and is in sliding contact with the ball 58 on its inner circumference.

The feedback link 54 is supported free to pivot around a pivot shaft 60, and the ball 58 provided at the other end is made to displace in the X-axis direction of the figure.

This ball 58 engages with the engaging member 90 formed at one end of the speed change link 9 which connects the speed change control valve 7, which performs intake and discharge of oil to and from the hydraulic cylinder 1 when the vehicle is moving forward, with a step motor 50. This forms the construction of a mechanical feedback mechanism based on the precess cam 2 and feedback link 54.

An engaging member 91 is formed at the other end of the speed change link 9. The engaging member 91 engages with a pin 52a projecting from a slider 52. The slider 52 is driven in an axial direction by the step motor 50 which functions as an actuator via a decelerating mechanism 51.

Further, a rod 80 of the spool 8 which slides inside the speed change control valve 7 is connected to a predetermined position of the speed change link 9 via a pin 53a of a connecting member 53.

A spring 81 is disposed parallel to the connecting member 53 between the connecting member 53 and the valve body 70. The spring 81 is provided so that feedback control is precisely performed without looseness between the engaging parts 90, 91 of the speed change link 9 and the ball 58 or pin 53a, or looseness of the feedback link 54.

In FIG. 2, when the power roller 3 gyrates to the Lo side, the precess cam 2 attached to the axial part 4A trunnion also rotates to the Lo side in the figure. Therefore, the engaging member 55a shown in FIG. 3 descends. On the other hand, when the precess cam 2 rotates to the Hi side, the engaging member 55a rises in FIG. 3. The speed change link 9 connected to the ball 58 and the other end is driven to the Lo or Hi side of FIG. 2 according to the gyration of the power roller 3.

Therefore, when the step motor 50 makes the slider 52 expand or contract according to a target speed ratio from a speed change control device 30, the spool 8 moves according to the displacement of one end of the speed change link 9. Due to this movement, a supply port 7P of the speed change control valve 7 communicates with an output port 7H or output port 7L. Specifically, the speed change control valve supplies pressurized oil to an oil chamber 1A or oil chamber 1B of the pressurized oil cylinder 1, and drives the trunnion 4 in an axial direction.

The power roller 3 gyrates according to the axial displacement of the trunnion, and varies the speed ratio. This gyration angle movement is transmitted to the other end of the speed change link 9 via the axial part 4A of the trunnion 4, the precess cam 2, and the feedback link 54. When the target speed ratio coincides with the real speed ratio, the differential pressure of the hydraulic cylinder 1 drives the spool 8 to a position having a value corresponding to the transmission torque of the power roller 3.

Figure 4:
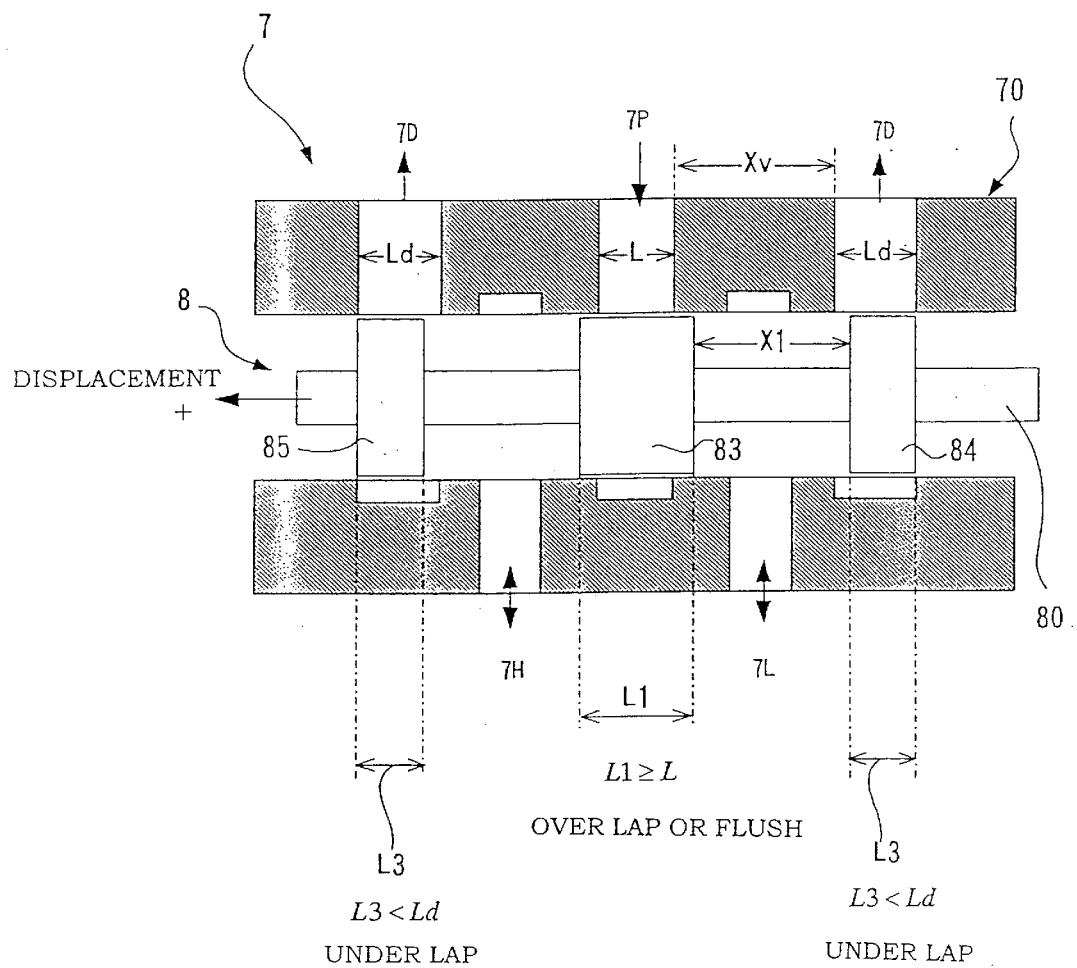
FIG. 4 is a sectional view of a speed change control valve according to this invention.

When the toroidal continuously variable transmission is on no load or when it is in a running state close to no load, the spool 8 is set to a neutral position where the lands 83–85 respectively face the supply port 7P and output ports 7H, 7L, as shown in FIG. 2 and FIG. 4, so the differential pressure of the hydraulic cylinder 1 is effectively 0.

Now, drain ports 7D, 7D are formed on both sides of the supply port 7P in the valve body 70 of the speed change control valve 7 as shown in FIG. 2 and FIG. 4. Further, the output ports 7L, 7H are respectively formed between the supply port 7P and drain ports 7D, 7D.

The output port 7H communicates with the oil chamber 1A of the hydraulic cylinder 1 shown in FIG. 3, and the output port 7L likewise communicates with the oil chamber 1B. The supply port 7P receives for example an oil pressure of a line pressure PL from an oil pump or the like, not shown, and the drain port 7D communicates with a tank, not shown, to which oil is discharged. These ports are formed as annular grooves on the inner circumference of the valve body 70 as shown in FIG. 4.

In the neutral position, in the substantially no-load state where speed change is not performed, the land 83 (first land) is formed facing the supply port 7P, and the lands 84, 85 (second lands) are formed respectively facing the pair of drain ports 7D, 7D. Of these, the land 84 is disposed on the side of the output port 7L, and the land 85 is disposed on the side of the output port 7H.

The relation between the lands 83–85 formed in the spool 8, the a supply port 7P and the drain ports 7D, 7D is set as shown in FIG. 4.

Specifically, if the width of the supply port 7P is L and the width of the facing land 83 (dimension in axial direction) is L1, $$L1 \geq L$$

The width L1 of the land 83 is equal to or greater than the width L of the supply port 7P, and in the neutral position of the spool 8, the land 83 blocks the supply port 7P. When the width L1 of the land 83 is greater than the width L of the supply port 7P, this is referred to hereafter as overlap, and when the width L1 of the land 83 coincides with the width L of the supply port 7P, this is referred to hereafter as flush.

If the width of the drain ports 7D, 7D is Ld and the width of the drain ports 84, 85 is L3, L3>Ld.

The width L3 of the lands 84, 85 is less than the width Ld of the drain port 7D, and in the neutral position of the spool 8, the drain ports 7D, 7D are slightly open. When the width L3 of the lands 84, 85 is less than the width Ld of the drain port 7D, this is referred to hereafter as underlap.

In the neutral position, the land 84 is disposed in a position wherein the drain port 7D communicates with the output port 7L, and likewise the land 85 is disposed in a position wherein the drain port 7D communicates with the output port 7H.

Specifically, in FIG. 4, if the spacing the axial direction between the land 83 facing the supply port 7P and the land 84 facing the drain port 7D is X1, than the spacing in the axial direction between the supply port 7P and the drain port 7D is Xv, the relation between the two is X1≧Xv.

In the neutral position of the spool 8, the drain port 7D facing the land 84 communicates with the output port 7L. The land 85 disposed on the left-hand side of FIG. 4 is configured in an identical way, so that in the neutral position, the land 85 is disposed such that the opposite drain port 7D communicates with the output port 7H.

A predetermined clearance is set between the outer diameter of the lands 83–85 of the spool 8 and the inner diameter of the valve body 70. As a result, even if the land 83 facing the supply port 7P overlaps, pressurized oil leaks to the output ports 7L, 7H and drain ports 7D, 7D via this clearance.

Therefore, in the neutral position where there is effectively no-load, the land 83 overlaps and closes the supply port 7P, whereas the lands 84, 85 underlap so the drain ports 7D, 7D open by a predetermined small amount. The output ports 7L, 7H connected to the oil chambers 1A, 1B of the hydraulic cylinder 1 communicate with the drain ports 7D, 7D.

Consequently, the oil in the oil chambers 1A, 1B of the hydraulic cylinder 1 is discharged via the output ports 7L, 7H until the differential pressure is substantially 0.

Figure 5:
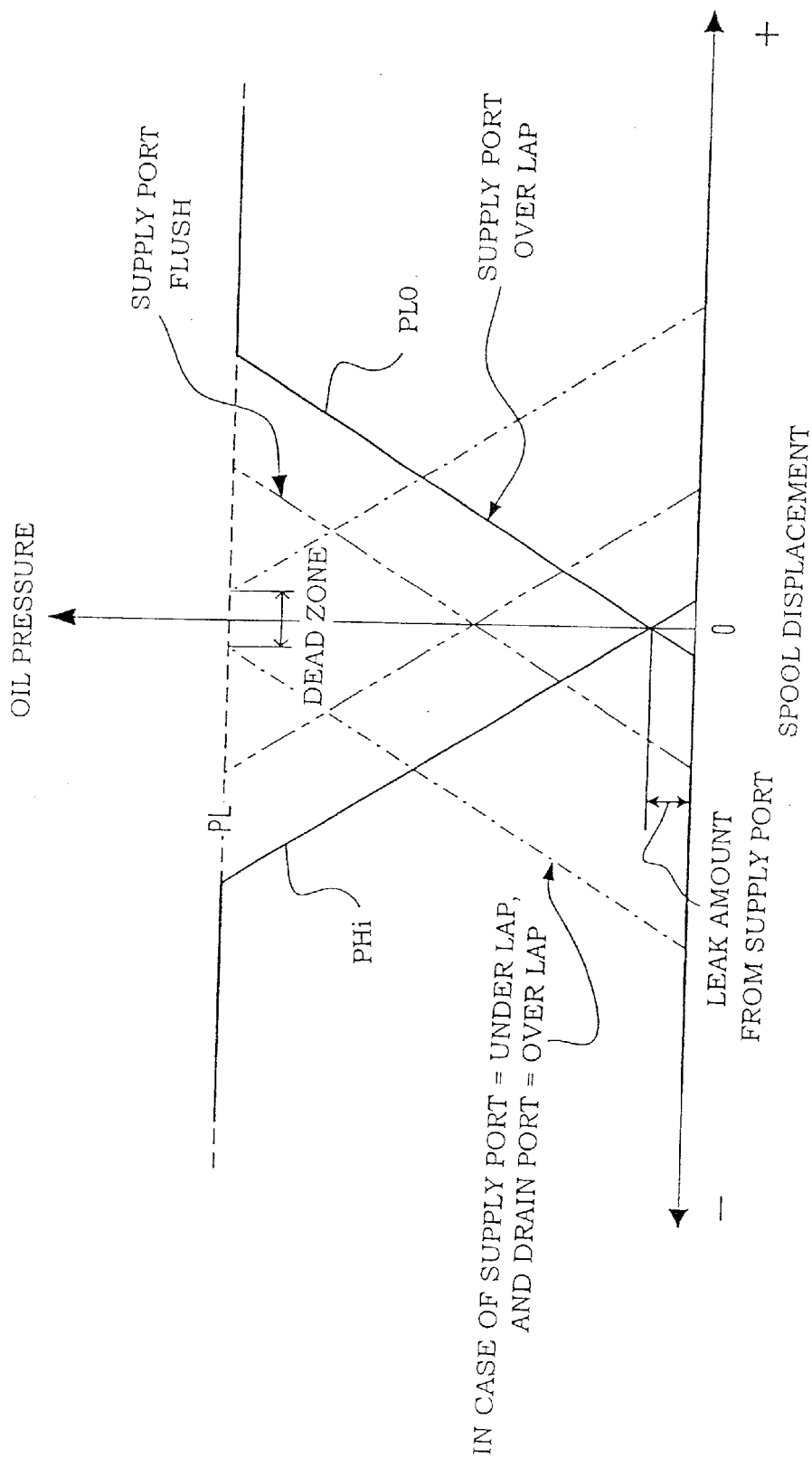
FIG. 5 is a graph showing oil pressure control characteristics of the speed change control valve according to this invention.

When the land 83 which closes the supply port 7P overlaps, the control characteristics of the hydraulic cylinder 1 which depend on the axial displacement of the spool 8 are as shown by the solid line in FIG. 5.

In FIG. 5, the position at which the displacement amount of the spool 8 is 0 is taken as the neutral position. When the axial displacement of the spool 8 is positive in the figure, the oil pressure of the oil chamber 1B increases, and a speed change to the Lo side occurs where the trunnion 4 rises. When the displacement direction of the spool 8 is negative in the figure, a speed change to the Hi side occurs wherein the oil pressure of the oil chamber 1A increases.

In the neutral position, the supply port 7P is shut by the land 83 which overlaps, but an oil pressure according to a leak flow from the clearance is supplied to the ports.

When the spool 8 is displaced in axial direction from this neutral position, one of the drain ports 7D is closed, and the opening amount of the other drain port 7D increases. Subsequently, the supply port 7P communicates with one of the output ports, and the opening amount increases according to the axial displacement of the spool 8. As a result, the oil pressure of one of the oil chambers of the hydraulic cylinder 1 increases whereas the oil pressure of the other chamber decreases, so the differential pressure increases. Due to this differential pressure, commands are issued regarding the drive of the trunnion 4 or the transmission torque acting on the power roller 3.

For example, when the spool 8 is displaced in the positive direction, the drain port 7D facing the land 84 closes, and the opening amount of the drain port 7D facing the land 85 increases. Subsequently, the supply port 7P communicates with the output port 7L, and the oil pressure of the oil chamber 1B of the hydraulic cylinder 1 rises.

Due to the increase of the opening amount of the supply port 7P according to the axial displacement of the spool 8, the oil pressure of the oil chamber 1A increases to the supply pressure. On the other hand, the oil chamber 1B communicates with the drain port 7D and the oil pressure decreases, so the differential pressure of the hydraulic cylinder 1 increases. As a result, the trunnion 4 is driven towards the speed ratio Lo side.

When the spool 8 is driven in the negative direction, the oil pressure of the oil chamber 1A increases conversely to the above, and the trunnion 4 is driven to the speed ratio Hi side.

Here, the relation between the supply port 7P, Drain port 7D and lands 83–85 in the neutral position will be described. On the side of the supply port 7P, there are two cases in case of the output ports 7L, 7H communicate and the supply port 7P is sealed. On the side of the drain port 7D, there are two cases in case of the output ports 7L, 7H communicate and the drain port 7D is sealed. A total of 4 combinations is therefore possible as shown in the following table.

TABLE 1

| Supply port-Output port | Drain port-Output port | Controllability | Flowrate |
|---|---|---|---|
| Communicating | Communicating | Stable | Large |
| Communicating | Closed | Unstable | Medium |
| Closed | Communicating | Stable | Medium |
| Closed | Closed | Unstable | Small |

In the no-load state, to eliminate the differential pressure of the hydraulic cylinder 1, there are two combinations on the supply port 7P side. One case is the supply port 7P communicates with the output ports 7L, 7H and the supply port 7P is sealed. Other case is a pressure difference is generated between the output ports 7L, 7H and the supply port 7P. Also, there are two combinations on the drain port 7D side to eliminate the differential pressure of the hydraulic cylinder 1. One case is the drain ports 7D, 7D communicate with the output ports 7L, 7H and the drain port 7D is sealed. Other case is a pressure difference is generated between the output ports 7L, 7H and the drain port 7D.

Of the neutral positions in these four combinations, when the oil consumption flowrate is at its largest and the supply port 7P and drain port 7D both communicate, the lands 83–85 underlap.

Next, when the oil consumption flowrate is large and one of the supply port 7P and drain port 7D is sealed, one of the land 83 or lands 84, 85 overlaps.

When the consumption flowrate is at its smallest and both ports are closed, the lands 83–85 overlap.

On the other hand, regarding the stability of speed change control, control is unstable when the drain port 7D is closed, and stable when the drain port 7D communicates.

This is because when a speed change is performed from the state where the drain ports 7D, 7D are closed, by opening one of the drain ports 7D, the oil pressure of the oil chamber communicating with this drain port 7D rapidly decreases. In particular, when the supply port 7P was communicating, control becomes unstable when the pressure of the oil chamber of the hydraulic cylinder 1 drops rapidly from a high-pressure state. In addition, an insensitive region occurs in the vicinity of the neutral position as shown by the dot-and-dash line of FIG. 5, and the control response also decreases.

To satisfy the dual conditions of speed change control stability and reduction of consumption flowrate in the speed change control valve 7, the following conditions are necessary. In the neutral position, the land 83 must overlap or be flush with the supply port 7P to close it, whereas the lands 84, 85 must underlap the drain port 7D so that it communicates with the output ports 7L, 7H. In this way, it is possible to achieve speed change control stability and reduction of oil consumption flowrate, the discharge flowrate specific to the oil pressure pump is reduced which suppresses the engine load, and fuel-consumption performance is improved.

Figure 6:
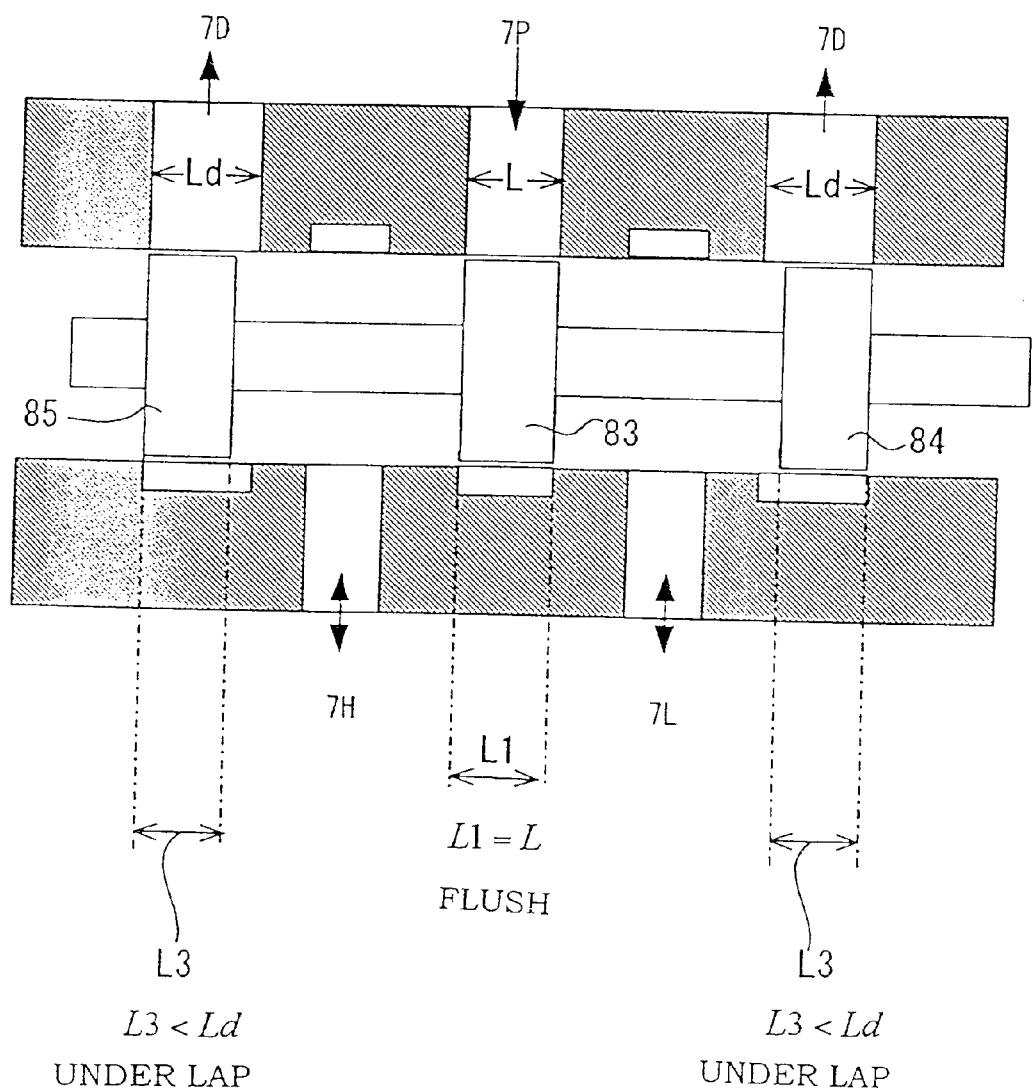
FIG. 6 is a sectional view of the speed change control valve when a land 83 facing a supply port 7P of the speed change control valve according to this invention is flush.

When the land 83 is flush with the supply port 7P, the width L1 of the land 83 is set equal to the width L of the supply port 7P, as shown in FIG. 6. Regarding the control characteristics in this case, as the leak flow from the corner of the land 83 increases, the oil pressure of the oil chambers 1A, 1B in the neutral position is higher than in the case of overlap, as shown by the double dotted line of FIG. 5.

Figure 7:
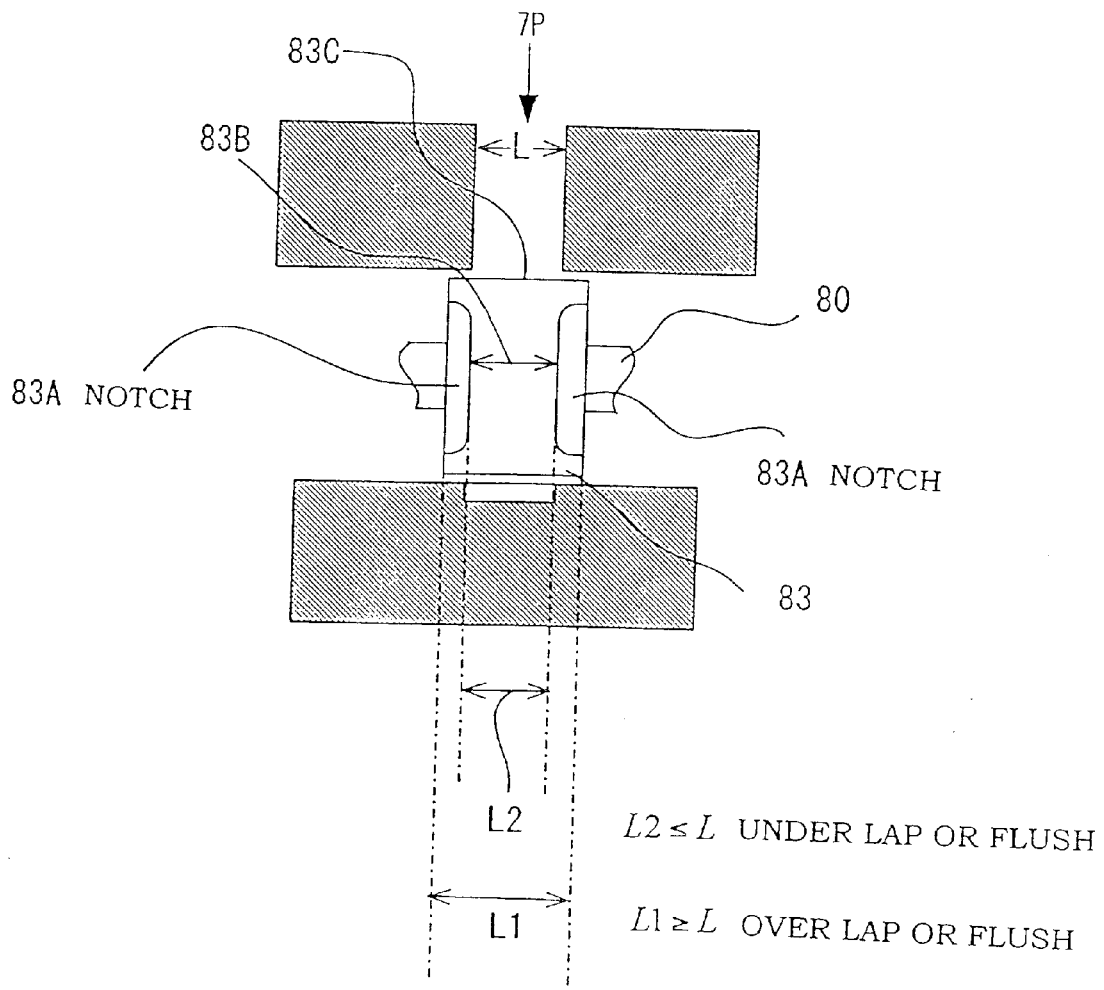
FIG. 7 shows a second embodiment of this invention, and is a sectional view of the speed change control valve.
Figure 8:
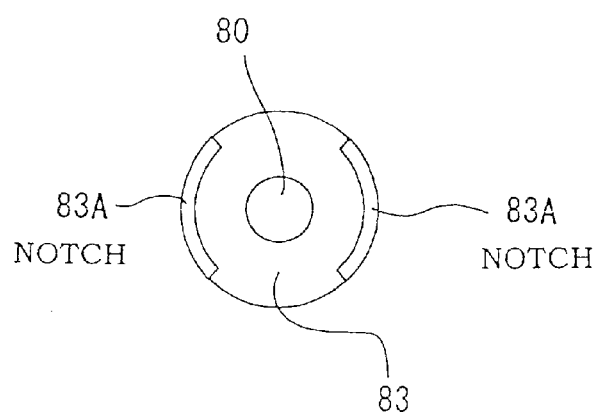
FIG. 8 is a diagram describing the shape of the land formed in a spool according to the second embodiment.
Figure 9:
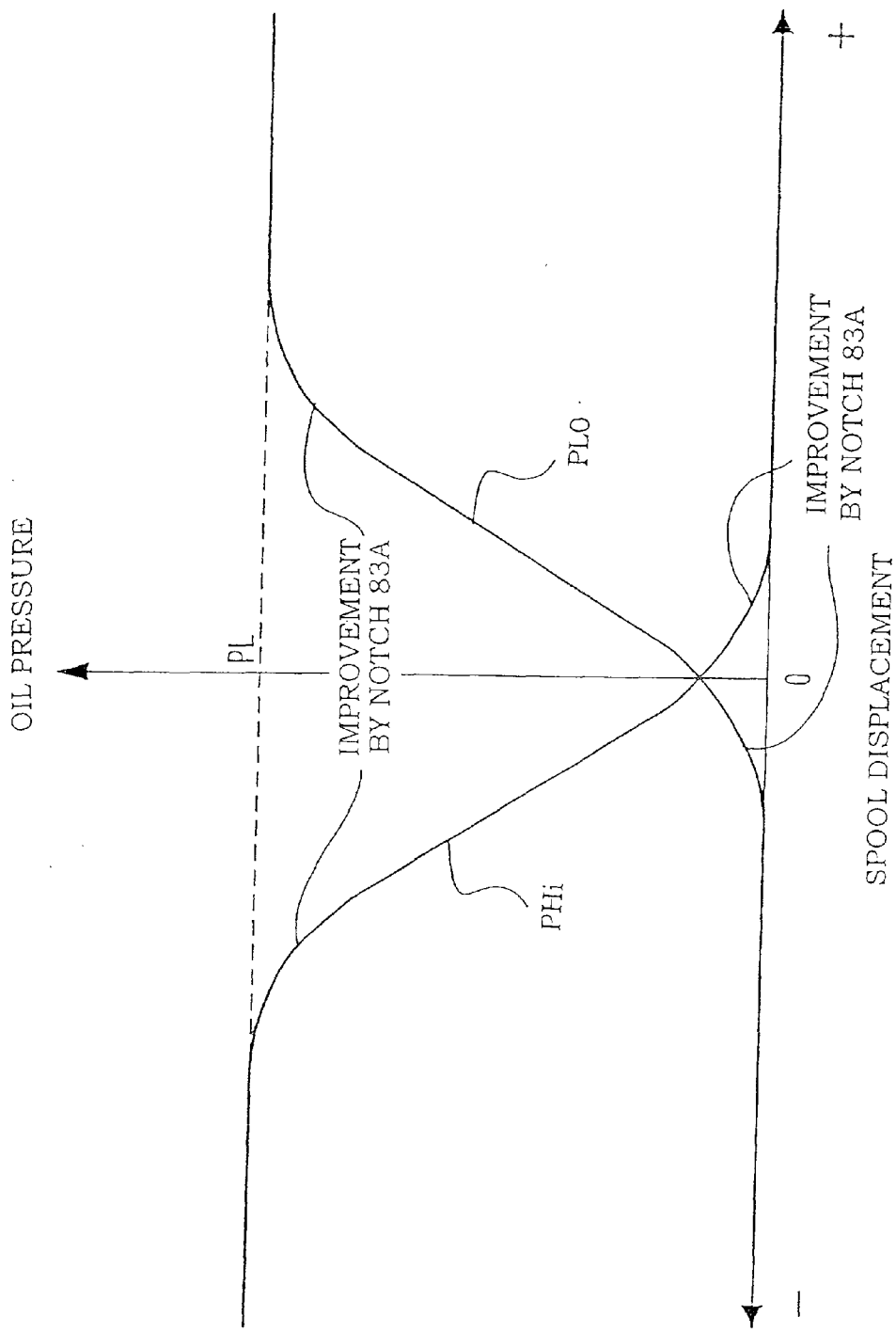
FIG. 9 is similar to FIG. 5, but is a graph showing oil pressure control characteristics of the speed change control valve according to the second embodiment.

FIG. 7 to FIG. 9 show a second embodiment. In this embodiment, a predetermined notch is provided on an end face of the land 83 of the first embodiment. The remaining features of the construction are identical to those of the first embodiment.

In the neutral position, the land 83 facing the supply port 7P is set to have a width L1 equal to or greater than the width L of the supply port 7P. In the neutral position, the land 83 overlaps or is flush with the supply port 7P, and closes the supply port 7P. In addition, plural arc-shaped notches 83A, 83A are formed in symmetrical positions relative to the rod 80 on both ends faces of the land 83, as shown in FIG. 7 and FIG. 8.

If the width of a thin part 83B of the land 83 in which the notches 83A, 83A are formed, is L2, $$L2 \geq L,$$

as shown in FIG. 7. In the neutral position of the spool 8, the thin part 83B underlaps or is flush with the supply port 7P, whereas a thick part 83C of the width L1 overlaps or is flush with the supply port 7P and closes part of the supply port 7P. The width L2 of the thin part 83B is the interval in the axial direction of the notches 83A, 83A on both end faces.

In this case, in the neutral position, oil pressure is supplied to the output ports from the gaps between the notches 83A, 83A which are the two end faces of the thin part 83B and the supply port 7P. When the load increases from the no-load state and speed change control is performed, an axial displacement of the spool 8 occurs, and the supply port 7P partly opens in the thin part 83B comprising the notches 83A. As a result, the line pressure PL is supplied to the oil chambers from the output ports, and the spool 8 displaces. After the thick part 83C enters the opening of the supply port 7P, the supply port 7P opens over the whole circumference of the land 83, and an oil pressure is supplied according to the axial displacement amount of the spool 8.

Therefore, the oil pressure can be varied continuously and smoothing in the vicinity of the minimum value and maximum value of the oil pressure control range, so speed change control can be performed more smoothly.

When there is a displacement of the spool 8 in the axial direction of from the neutral position, the oil pressure can be rapidly increased due to the notches 83A, response is enhanced and speed change control stability is improved. At the same time, as the width L2 of the thin part 83B is arranged to be flush or underlap, the leak flow rate to the oil chamber in which the oil pressure drops can be rapidly decreased, the consumption flowrate in the speed change control valve 7 can be further suppressed, and fuel-consumption performance can be improved.

Figure 10:
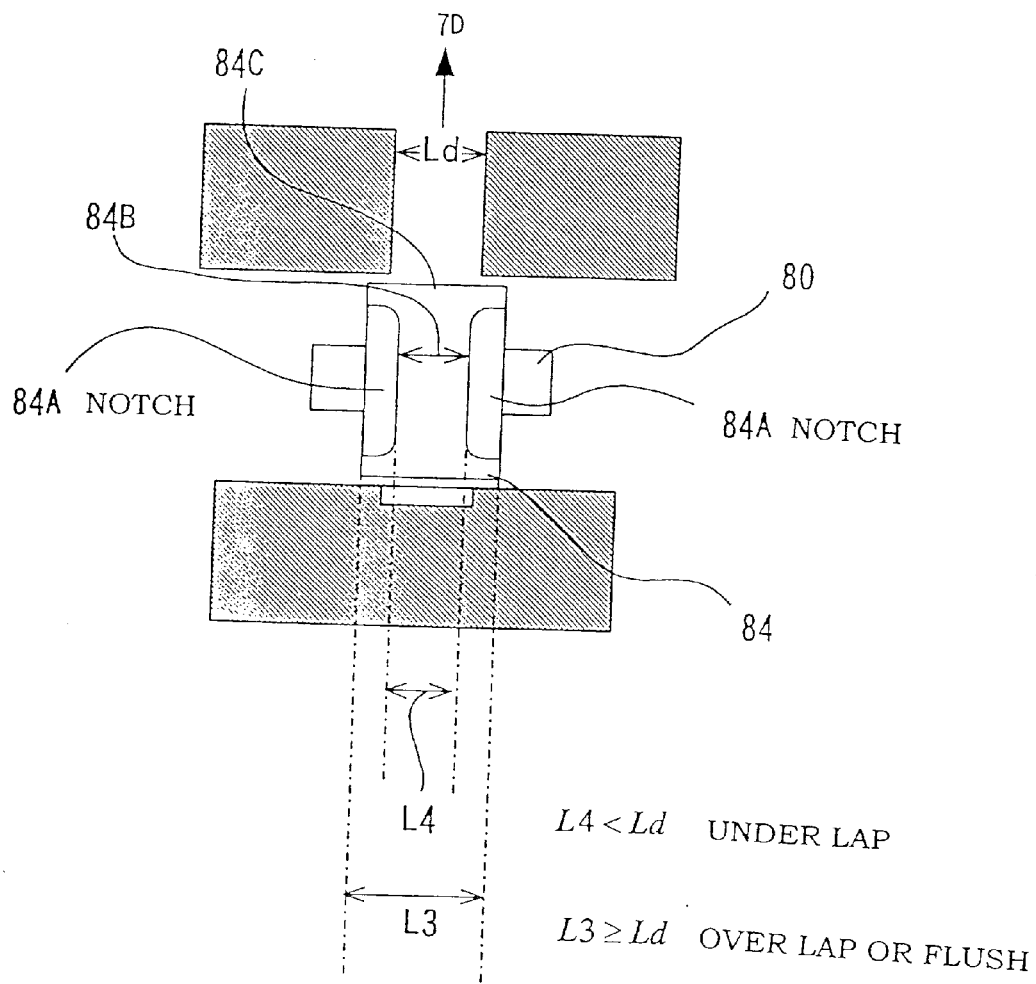
FIG. 10 is similar to FIG. 4, but showing a third embodiment of the invention, and is a sectional view of the speed change control valve.

FIG. 10 shows a third embodiment of this invention, wherein predetermined notches are provided in the end faces of the lands 84, 85 of the aforesaid second embodiment. As in the case of the land 83, a width L4 of a thin part 84B is made less than the width Ld of the drain port 7D, whereas the width L3 of the lands 84, 85 is set equal to or greater than the width Ld of the drain port 7D. The remaining features of the construction are identical to those of the second embodiment. In the neutral position, the lands 84, 85 facing the drain port 7D are set to have the width L3 equal to or greater than the width Ld of the drain port 7D. On the other hand, notches 84A, 84A are formed in axially symmetrical positions of the rod 80 as in the case of the land 83 of the aforesaid second embodiment, and in the neutral position, they overlap or are flush so as to close the drain port 7D. Also, if the width of the thin part 84B of the land 84 in which the notches 84A, 84A are formed is L4, $$L4 < Ld$$

as shown in FIG. 10. In the neutral position of the spool 8, the thin part 84B underlaps the drain port 7D, whereas a thick part 84C of width L3 (i.e., the width of the land 84) overlaps or is flush with the supply port 7P, and it closes part of the drain port 7D. In FIG. 10, the lands 84, 85 which can face the pair of drain ports 7D, 7D have an identical construction, so only the land 84 is described and the description of the land 85 is omitted.

In this case, in the neutral position, oil is discharged from the gaps between the notches 84A formed in the end faces of the thin part 84B and the drain port 7D. Therefore, when the load is increased from the no-load state and speed change control is performed, when a displacement of the spool 8 in the axial direction occurs, the drain port 7D opens in the notch 84A. From this state, the end face of the land 84 moves according to the displacement of the spool 8. As a result, the drain port 7D shifts smoothly from an opening due only to the notch 84A to a state where it is fully open over the whole circumference of the land 84, and the discharge amount of pressurized oil increases smoothly. Therefore, the oil pressure control characteristics are substantially identical to those of FIG. 9 of the aforesaid second embodiment. Further, the average pressure in the oil chambers 1A, 1B of the hydraulic cylinder 1 decreases via the output ports 7L, 7H, so durability of seals and rings, etc., of the hydraulic cylinder 1 is enhanced.

The notch 84A may be provided only in the land 84 facing the output port.

Figure 11:
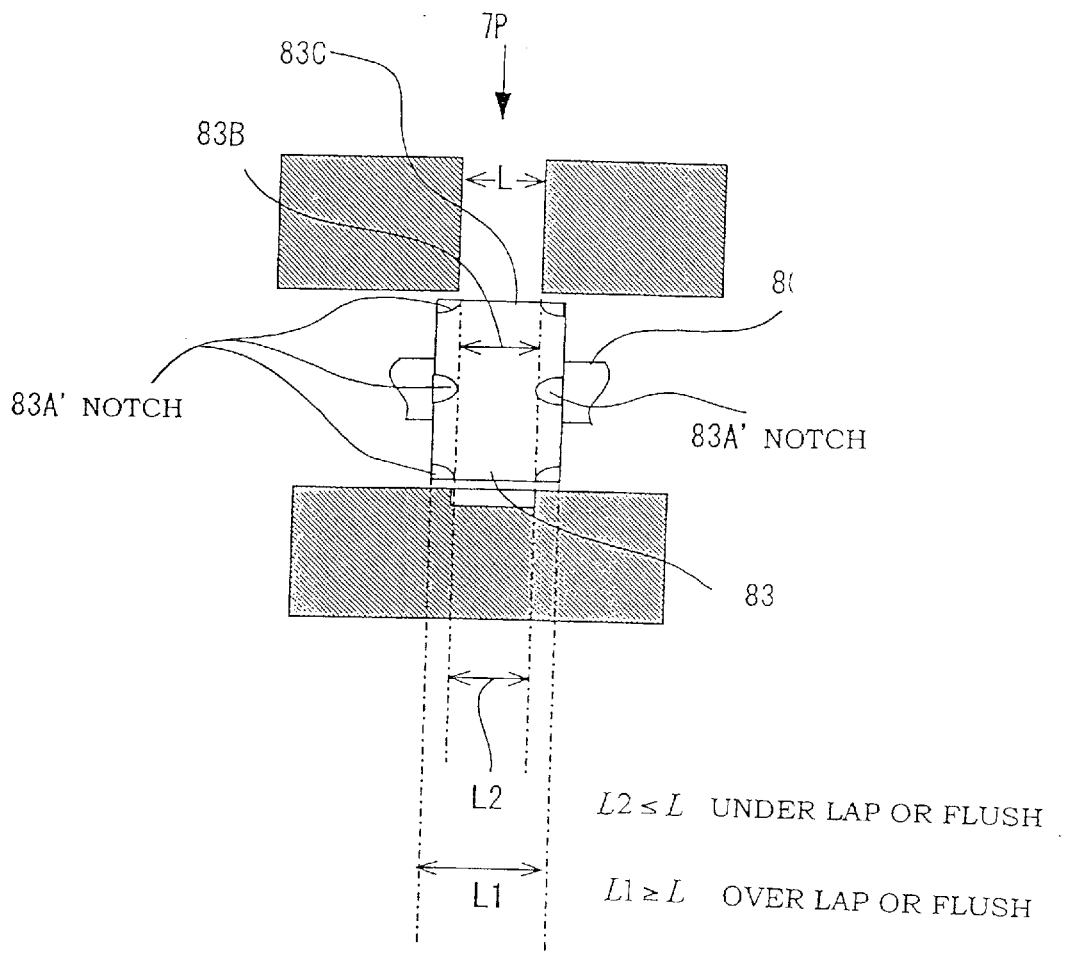
FIG. 11 is similar to FIG. 4, but showing a fourth embodiment of the invention, and is a sectional view of the speed change control valve.
Figure 12:
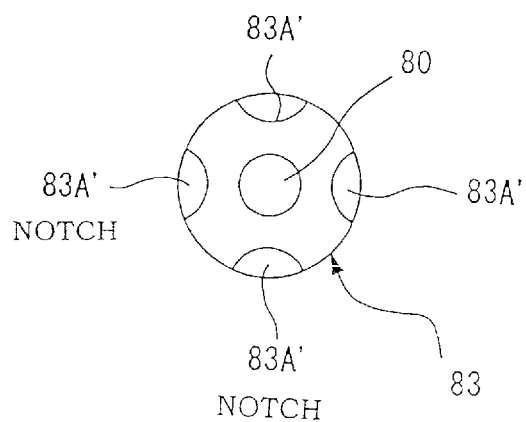
FIG. 12 is similar to FIG. 8, but is a diagram describing the shape of the land formed in the spool according to fourth embodiment.

FIG. 11 and FIG. 12 show a fourth embodiment wherein the notch 83A of the aforesaid second embodiment has a semicircular shape and extends in the axial direction. The remaining features of the construction are identical to those of the second embodiment.

Plural semicircular shaped notches 83A' are formed at symmetrical positions relative to the rod 80 which is the axis. Four of the notches 83A' may for example be formed on end faces and extend in the axial direction as shown in the figure.

By providing these notches 83A' in axially symmetrical positions, the oil pressure from the supply port acts on the land 83, thereby preventing it from being pushed against the inner circumference of the valve body 70 so that the spool 8 functions correctly, and reliability is improved.

The shape of the notch 83A' may be chosen as desired according to the control characteristics. Further, even if these notches 83A' are provided in the lands 84, 85 facing the drain ports 7D, the same effects and advantages are obtained.

In the aforesaid embodiments, the speed change control valve was configured so as to drive the spool 8 housed in the valve body 70 via the speed change link 9 connected to the step motor 50 and mechanical feedback mechanism, but the invention is not limited to this arrangement. For example, the speed change control valve may be a valve wherein a port is formed in a sleeve housed within the inner circumference of the valve body, and the spool, connected to the mechanical feedback mechanism and driven by the step motor 50, is housed within the inner circumference of this sleeve as disclosed in Tokkai Sho 63-130954.

The contents of Japanese Application No.11-278669, with a filing date Sep. 30, 1999, are hereby incorporated by reference.

The embodiments of this invention in which an exclusive property or privilege is claimed are defined as follows:

What is claimed is:

1. A speed change control device for a continuously variable transmission comprising:
    a trunnion which supports power rollers gripped between input/output disks free to rotate, and is able to rotate around an axis and displace in an axial direction,
    a hydraulic cylinder which drives the trunnion in an axial direction, and
    a speed change control valve which controls an oil pressure supplied to this hydraulic cylinder, wherein.
    the speed change control valve comprising;
        a spool which is free to displace and is housed in the speed change control valve and provides a first land which can face a supply port supplying a supply pressure and second lands which can respectively face first and second drain ports formed on either side of the supply port,
        first output port is provided for allowing a first oil chamber provided in the hydraulic cylinder to selectively communicate with the supply port or the first drain port according to the displacement of the spool,
        second output port is provided for allowing a second oil chamber provided in the hydraulic cylinder to selectively communicate with the supply port or the second drain port according to the displacement of the spool,
        the first land faces the supply port and the second lands face the first and second drain ports in a neutral position of the spool, and
        the first land closes the supply port and the second lands are formed such that the first drain port communicates with the first output port which is formed between the first drain port and the supply port, the second drain port communicates with the second output port which is formed between the second drain port and the supply port in the neutral position of the spool.

2. A speed change control device for a continuously variable transmission comprising:
    a trunnion which supports power rollers gripped between input/output disks free to rotate, and is able to rotate around an axis and displace in an axial direction,
    a hydraulic cylinder which drives the trunnion in the axial direction, and
    a speed change control valve which controls an oil pressure supplied to this hydraulic cylinder, wherein
    the speed change control valve comprising;
        a spool which is free to displace and is housed in the speed change control valve and provides a first land which can face a supply port supplying a supply pressure and second lands which can respectively face first and second drain ports formed on either side of the supply port,
        first output port is provided for allowing a first oil chamber provided in the hydraulic cylinder to selectively communicate with the supply port or the first drain port according to the displacement of the spool,
        second output port is provided for allowing a second oil chamber provided in the hydraulic cylinder to selectively communicate with the supply port or the second drain port according to the displacement of the spool,
        the first land faces the supply port and the second lands face the first and second drain ports in a neutral position of the spool, and
        the width of the first land is set to be equal to or greater than the width of the supply port, and the width of the second lands are set to a width at which the first drain port communicates with the first output port which is formed between the first drain port and the supply port and the second drain port communicates with the second output port which is formed between the second drain port and the supply port in the neutral position of the spools.

3. A speed change control device for a continuously variable transmission as defined in claim 2, wherein a notch is formed from both end faces of the first land along the outer circumference of the land, and the interval between these notch end parts is set to be equal to or less than the width of the supply port.

4. A speed change control device for a continuously variable transmission as defined in claim 2, wherein a notch allowing the first and second drain ports to open in the neutral position of the spool is formed in an end face of one of the second lands, and the width of the second land is set to be equal to or greater than the width of the first and second drain ports.

* * * * *